March 26, 1963 A. E. G. BJÖRKMAN ETAL 3,083,077
METHOD FOR THE RECOVERY OF SODIUM CARBONATE
FROM ALKALI-CONTAINING SPENT
CELLULOSE LIQUORS
Filed May 26, 1960
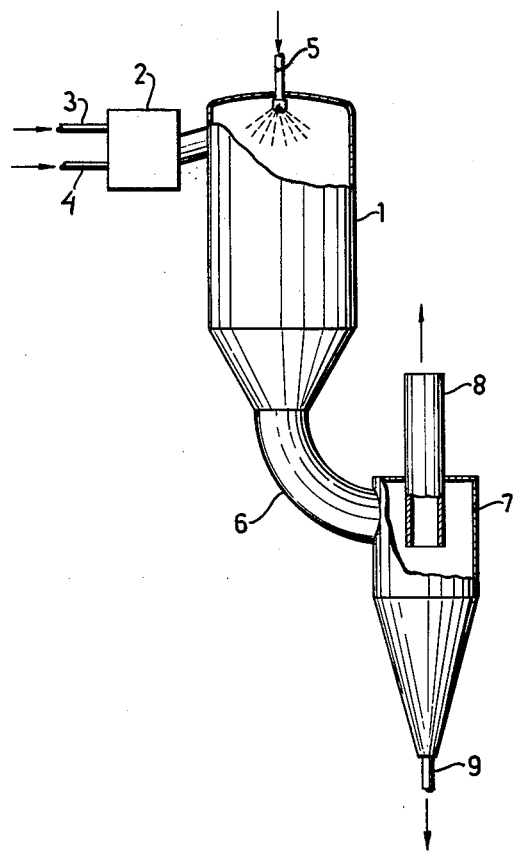
INVENTORS
Anders Eril Gustaf Björkman
Per Erik Andersson
By
Pierce, Scheffler & Parker
Attorneys United States Patent Office 3,083,077
Patented Mar. 26, 1963

3,083,077
METHOD FOR THE RECOVERY OF SODIUM CARBONATE FROM ALKALI-CONTAINING SPENT CELLULOSE LIQUORS
Anders Erik Gustaf Björkman and Per Erik Andersson, Saffle, Sweden, assignors to Billeruds Aktiebolag, Saffle, Sweden, a company of Sweden
Filed May 26, 1960, Ser. No. 31,892
Claims priority, application Sweden May 29, 1959
7 Claims. (Cl. 23—48)

During recent years the recovery of chemicals from spent sulphite liquors from the pulping of plant materials has attained an increasing attention. It has not, in the original calcium pulping method, been possible to provide a useful recovery method. When using a cooking liquor based upon ammonium, it has on exceptional cases been possible to recover the sulphur. When using other so-called soluble bases it has been possible to recover the magnesium, owing to the fact that the spent liquor, after having been evaporated and combusted, yields a magnesium oxide which is sufficiently reactive so as to be able to absorb the sulphur dioxide from the flue gases from the combustion.

If evaporated, spent liquors, based upon sodium, are completely combusted at a normal combustion temperature, the alkali is recovered as sulphate which is not directly suitable for sulphite cooking. Also the so-called wet combustion method according to Cederquist or Zimmermann yields sulphate. Therefore, it has become common practice to combust sodium-based spent sulphite liquors in the so-called soda recovery furnace, which was developed for combusting spent sulphate cooking liquors. This furnace contains a reducing atmosphere at the bottom, and thus yields the alkali as a molten mixture of carbonate and sulphide.

When spent sulphite liquors are combusted in a soda recovery furnace the major part of the sulphur remains in the melt and the rest escapes with the flue gases as sulphur dioxide. In order that the alkali in the molten mixture of sodium carbonate and sulphide shall be useful for the preparation of fresh sulphite cooking liquor, the melt must be treated so that the sulphur is transformed or removed and the alkali is recovered in a form useful for the preparation of cooking liquor, it being preferred to transform the sulphide into sulphite. Many suggestions have been made to solve said problem, and a couple of them have been practically useful, but they are comparatively complicated and their utilization is limited.

A more direct process is the AST method, the atomized suspension technique. In this method the evaporated liquor is not combusted but is heated, while floating finely divided state in aqueous vapour, by means of heated metal surfaces. The liquor dries, and its solids decompose under a more or less complete gasification. There is formed a combustible gas, admixed with aqueous vapour, and a residue substantially consisting of sodium carbonate, usually admixed with a quantity of non-gasified carbon. The gas can be combusted, if desired after the aqueous vapour has been removed by condensation, thus yielding the heat necessary for the heating of the metal surfaces.

The sodium carbonate produced by the AST method is usually sufficiently pure to be used for the preparation of sulphite cooking liquor. However, the AST method has certain inconveniencies. It is difficult to find metals or alloys which can withstand the necessary high wall temperatures, especially if the material to be gasified contains sulphur which produces highly corroding hydrogen sulphide.

It has recently been suggested to gasify the spent liquor, after having been evaporated to a solids content of 50-60%, under a partial combustion of the combustible constituents of the liquor by an addition of air. This process, however, is very difficult to control, owing to the fact that the amount of added oxygen, the water content of the liquor, and the temperature must be carefully regulated if the ash constituents of the liquor are to be recovered as carbonate.

It is the main object of the present invention to provide a process for recovering the alkali content of alkali-containing spent cooking liquors as carbonate, while avoiding the difficulties mentioned above.

It is another object of the invention to provide a direct heat transmission process.

It is another object of the invention to provide a rapid and continuous process so as to make it possible to use a comparatively small apparatus.

The invention is based upon the observation that the spent liquor on a rapid heating to at least about 500° releases its water content and then immediately begins to decompose, releasing its sulphur content in gaseous state, possibly before any appreciable gasification of the carbon begins, and that, if the inorganic ash particles are kept in contact with the sulphur-containing gas at a higher temperature and/or in the presence of free oxygen, there is a risk that the ash particles will absorb sulphur from the gas.

Based upon these observations the invention is characterized in that a hot combustion gas is supplied to one end of a reaction chamber, that the spent liquor is introduced into the same end of the reaction chamber in finely divided state, the hot gas thus passing through the reaction chamber carrying the liquor particles, regulating the amount and temperature of the hot gas, the amount and the water content of the liquor, and the particle size of the liquor so that the equalized temperature of the gas mixture in the reaction chamber is at least about 500° C. and that such solid or molten particles as remain after the decomposition of the liquor are separated from the gas phase at the opposite end of the reaction chamber. For practical reasons the highest temperature of the gas mixture is preferably about 1000° C. The amount of added liquor and hot gas should preferably be such that the residence time of the liquor particles in the reaction chamber is below 30 seconds. This time is, within the temperature region stated, sufficient for the sulphur to be completely released to the gas phase while the carbon being partially gasified. Usually the release of sulphur is complete after a few seconds. At a higher temperature, for instance 900° C., the carbon may rapidly and almost completely be released into the gas phase, disregarding such carbon as remains in the solid or molten residue as sodium carbonate.

It has been found to be important that the liquor particles, while floating in the hot air more or less decomposed, have no opportunity to react with free oxygen, as this would bring about an increase of the sulphur content of the carbonate residue. Therefore, the liquor ought not to be sprayed by means of air, but by means of steam or by means of any method in which the liquor is sprayed under pressure. However, it has been found possible to allow the hot gas to contain a limited amount of free oxygen without giving rise to an undesirably high sulphur content in the carbonate residue. This phenomenon can be explained by the following hypothesis. If the liquor has been scattered without using air, the liquor particles when arriving in the hot gas will first be surrounded by a protective layer of steam which counteracts the contact with the oxygen present in the hot gas. When the particles begin to decompose, they release combustible gases which consume the limited amount of free oxygen in the hot gas. In the same way it appears that $SO_2$ in the hot gas is reduced to form $H_2S$ before it has had time to interfere with the inorganic substance of the particles. If the liquor is sprayed by air there may be free oxygen in contact with the particles in such a way as to result in an undesired increase of the sulphur content of the carbonate. Therefore, any added oxygen may only be allowed to come into contact with such combustible material as is different from the liquor particles.

A more complete gasification of the carbon may be accomplished by choosing a high temperature of the gas mixture, or by an additional gasification or combustion with air after the ash particles having been separated from the sulphur-containing reaction gases.

Thus, the main principle of the invention is an adiabatic process in which the evaporated liquor, having a suitable particle size, is mixed with a hot gas, produced by burning a fuel, the hot gas having such a quantity and temperature that a rapid drying occurs. When the particles have been further heated to a certain starting temperature, a decomposition begins automatically, resulting in a release of sulphur and organic substance into gaseous state, whereas after the finished decomposition the alkali of the liquor occurs substantially as carbonate. By suitably balancing the quantity and the temperature of the hot gas it is possible to accomplish a complete or substantially complete release of the sulphur into the gas phase in a wide temperature range, while in the same temperature range the release of carbon will be more or less incomplete. During the drying and decomposition the temperature will vary very much in the particles and in the gas phase, but said variations will be rapidly equalized to form what is above termed "the equalized temperature of the gas mixture."

During the decomposition of the inorganic substance of the liquor particles, there occur a great number of reactions resulting in the sulphur being released into the gas phase as hydrogen sulphide, making possible the formation of an inorganic residue consisting of sodium carbonate. Sulphate and other inorganic salts which contain sulphur and oxygen are also reduced and decomposed more or less completely. The residue usually contains a smaller amount of sulphate but little or no substance consuming iodine on titration, e.g. sodium sulphide or thiosulphate. The hot gas may be allowed to contain a limited amount of air (oxygen) if measures are taken that the oxygen does not come into contact with the liquor particles, because such contact would jeopardize the formation of a substantially pure carbonate before the oxygen has become consumed by the combustible gases released from the particles, thus evolving heat. If the amount of oxygen in the hot gas is increased above the actual allowable limit, the formation of sulphate, sulphide, etc., increases, and the carbonate becomes less useful or useless for the preparation of cooking liquor. The addition of air (oxygen) involves the advantage that the amount of fuel necessary for reaching a certain temperature of the gas mixture can be reduced.

The organic substance is transformed into carbon, completely or almost completely. It has been found that the particle size of the liquor and the temperature of the gas mixture determines the extent to which carbon is released to the gas phase. If the hot gas has a sufficiently high temperature and is supplied in a sufficient quantity, and if the liquor particles are sufficiently small, practically all carbon may be released to the gas phase in connection with the decomposition of the liquor. It does not appear that the oxygen content of the hot gas affects the release of carbon as long as the temperature of the gas mixture is unchanged. After the decomposition has taken place, which only requires one or a few seconds, there is an additional comparatively slow release of carbon into the gas phase by gasification. It does not appear to be suitable to accelerate the gasification by an addition of oxygen after the hot gas stage, because this results in an increased formation of sulphate. At a lower temperature of the gas mixture, produced by the hot gas being supplied in a smaller quantity or having a lower temperature, the gasification of sulphur may be incomplete, too.

The scattering of the liquor into fine particles may take place before or when it is admixed with the hot gas, or if desired in connection with the combustion process producing the hot gas.

The hot gas may be produced in various ways. A fuel oil or any solid, liquid or gaseous fuel may be used. When the liquor decomposes, the hot gas and the liquor produces a combustible gas which can be used for the production of steam. Additional steam may be produced by a combustion of the non-gasified carbon contained in the ash which is separated from the gas. In many cases the produced steam can be economically utilized, but in other cases there is no possibility to utilize all steam totally produced from the solids of the liquor and from the additional fuel. In such cases it is necessary to produce the hot gas without using any additional fuel, or a reduced amount of additional fuel. According to the invention there are several possibilities for such a production of hot gas. In any case the air must be supplied in a stoichiometric amount, or in a small excess, relatively to the amount of fuel. Otherwise there is the risk of too much sulphate being formed in the carbonate. The excess of air that can be tolerated in the hot gas is dependent on the character of the spend liquor, e.g. its content of organic substance, and on the extent to which carbon is released into the gas phase, i.e. the temperature of the produced gas mixture. For a normal spent sulphite liquor containing 50% solids said excess of air is about 1 $m.^3$ air (at normal pressure and temperature) for one kilogram of liquor solids.

In case that both sulphur and carbon have been completely or almost completely released into the gas phase, the produced combustible gas may be divided so that one portion is utilized for the production of hot gas, while the residue is utilized for the production of steam. The presence of small amounts of hydrogen sulphide or sulphur dioxide in the hot gas does not prevent the formation of a substantially sulphur-free carbonate, useful for the preparation of cooking liquor.

If the release of carbon only is incomplete it is necessary first to separate the residual carbon and carbonate from the gas which contains hydrogen sulphide, and the gas is then combusted separately, if desired together with an additional fuel. Thereafter, it is possible either to gasify the carbon by air in a suitable gas generator while recovering the carbonate and utilize the gas thus produced for the production of hot gas or steam, or both, or to combust the carbon completely for the production of a hot gas, if desired parallel with the production of steam, or for the mere production of steam. Another possibility is to leach the carbonate from the residue and to dry and combust the residual carbon, or to subject the residue to a so-called wet combustion, resulting in a solution of sodium carbonate. Other modification and combinations of known methods are also possible within the scope of the invention.

When the solids of the liquor decomposes, which is an exothermic reaction, the temperature may be 1000° C. or still higher. Said temperature falls down to 900° C. or lower after the rapid reactions of the decomposition have ceased and the temperature of the gas mixture has been reached. The temperature of the gas mixture must not be below 500° if the gasification of sulphur is to be satisfactory, i.e. the produced sodium carbonate is to be sufficiently pure so as not to contain any appreciable amounts of sulphide and thiosulphate. Too high temperatures must be avoided, owing to the risk that the produced carbonate becomes contaminated, e.g. from sulphide. The effective release of sulphur, and also of carbon, during the rapid decomposition of the liquor solids, which occurs after a rapid drying of the liquor particles in hot gases (consisting of carbon dioxide, steam, nitrogen and minor amounts of sulphur dioxide and oxygen) is a phenomenon hitherto unknown. As a matter of fact the process is so rapid that it does not have time to reach an equilibrium. This may be the explanation why the release of sulphur can be satisfactory also at higher temperatures, where it might be expected, for thermodynamic reasons, that the carbonate should contain a high amount of sulphide. It appears that the steam atmosphere produced in and around the liquor particle from the water of the particle is an important factor as a facilitating and protecting gas.

At the technical performance of the present invention it is possible to build the walls etc. of the gasification reactor from a material which is fully resistant to the temperature and to hydrogen sulphide and sodium carbonate. There are ceramic materials and mortars, e.g. based upon so-called chromium-magnesite or zirconium oxide, which have a sufficient lifetime at the actual conditions. The reaction time is short, and therefore the volume of the reactor may be small.

As stated above the degree of release of the carbon will be dependent on the amount and temperature of the hot gas and on the particle size. The spraying of spent liquors, which are usually highly viscid in their concentrated form, requires much energy, and therefore the degree of spraying must be determined by the advantages that can be obtained. Thus, the possibility of producing a sufficiently finely-divided liquor determines the highest concentration of the liquor. This maximum concentration corresponds to a solids content of about 55% for normal sulphite liquors. The lower limit for the solids content is chosen to give a satisfactory heat economy, and should preferably not be below about 40%. In certain cases, e.g. when it is desired to make the carbon release completely into the gas phase without consuming too high a quantity of hot gas, or a hot gas which is too hot, it is necessary to spray the liquor into a very finely-divided form. On the other hand, if a great residue of carbon can be accepted, e.g. if the residue from the hot gas treatment is to be subject to a leaching process, it may be advantageous to produce a moderate degree of spraying only. The spraying of the liquor into finely-divided form may be effected by known means, e.g. pressure nozzles or double-flow nozzles, for instance one flow of spent liquor and one flow of spraying agent, which may be steam or a gas. As stated above, air is no suitable spraying agent, because the air comes into too intimate a contact with the liquor particles, resulting in an increased formation of sulphate.

The invention will be described more closely with reference to the following examples and to the accompanying drawing. In the examples the term "iodine-consuming substances" represents equi-molecular amount of $Na_2S$, $Na_2S_2O_3$ and $Na_2SO_3$. The drawing illustrates a reaction chamber 1, connected at its upper end to a combustion chamber 2, into which oil and air are fed through pipes 3 and 4. The spent liquor is supplied under pressure to the top of the reaction chamber and is sprayed by means of a known spraying device 5. The conical bottom of the reaction chamber is connected by a wide conduit 6 to a cyclone separator 7, which separates the inorganic residue, which is withdrawn through the bottom outlet 9, from the gas mixture, which leaves the cyclone separator through the funnel 8.

Example 1

Fuel oil was burned in an apparatus as shown in the drawing at a rate of 12.4 kg./h., together with a stoichiometric amount of air. Spent sulphite liquor containing 49% solids having the composition $C_{10}H_{11.4}O_{5.8}S_{0.49}Na_{0.62}$ was added at a rate of 1.1 lit./min. and was sprayed by means of steam into finely divided particles having a size of about 50 microns. After conditions had stabilized the temperature of the gas mixture was 600° C. The solid reaction product contained 70% carbon and 25% $Na_2CO_3$. The amount of iodine-consuming substance was about 1%, and the amount of $Na_2SO_4$ was 2.5%, calculated upon the carbonate content. The time from the addition of the liquor to the separation of the solid reaction product from the gas was about 20 seconds.

Example 2

The same fuel oil as in Example 1 was burned in the same apparatus at a rate of 15.0 kg./h. with a stoichiometric quantity of air, and the same liquor as in Example 1 was sprayed into the produced hot gas at a rate of 1.0 lit./min. After conditions had stabilized the temperature of the gas mixture was 740°. The solid reaction product contained 59% carbon and 35% carbonate. The amount of iodine-consuming substances was 0.1%, and the amount of $Na_2SO_4$ was 6.1%, calculated on the carbonate content. The reaction time was 15 seconds.

Example 3

This experiment was carried out as described in the preceding examples, but the amount of oil was 13 kg./h. and the amount of liquor was 0.7 lit./min., resulting in a temperature of the gas mixture of 750° C. In spite of the short reaction time, 5 seconds, the composition of the ash was 45% carbon and 46% carbonate, and further 1% iodine-consuming substances and 5.1% sulphate, calculated on the carbonate content.

Example 4

Fuel oil was burned in the described apparatus at a rate of 15.0 kg./h. with a stoichiometric amount of air. The same liquor as in Example 1 was sprayed into the produced hot gas in finely-divided form at a rate of 0.6 lit./min. When conditions had stabilized the temperature of the gas mixture was 880° C. When the temperature after a reaction time of 15 seconds had fallen to 765° C., a solid reaction product was obtained containing 10% carbon and 82% sodium carbonate, and 0.5% iodine-consuming substances and 3.2% sodium sulphate, calculated on the carbonate content.

Example 5

Fuel oil was burned at a rate of 10.0 kg./h. with an excess of air corresponding to 0.7 m.$^3$ (at normal pressure and temperature) for each kilogram of liquor solids. Liquor of the composition described in Example 1 was sprayed into the produced hot gas at a rate of 0.6 lit./min. The resulting gas mixture temperature was 760° C. After a reaction time of 4 seconds an ash was produced containing 49% carbon and 43% carbonate, and 1.0% iodine-consuming substances and 6.4% sodium sulphate, calculated on the carbonate content.

Example 6

Example 5 was repeated with the alteration that the quantity of liquor was increased to 1.1 lit./min. and the excess of air was increased to 1.3 m.$^3$ (at normal pressure and temperature) for each kilogram of liquor solids. The temperature of the gas mixture was unchanged. The produced ash had a sulphur content of 20% and a content of iodine-consuming substances of 3%, calculated on the carbonate content.

Example 7

This experiment was carried out in order to investigate the importance of the air excess for the sulphate formation at a lower temperature. Examples 5 and 6 were repeated at a gas mixture temperature of 645° C. At an air excess of 0.7 m.$^3$ for each kilogram of liquor solids the sulphate content was 4.9%, and an air excess of 1.3 m.$^3$ resulted in a sulphate content of 13%, calculated on the carbonate content.

Example 8

This experiment was carried out in order to investigate the influence of a variation in the sulphate content of the spent liquor upon the sulphate content of the produced carbonate ash. Two experiments were made with the same liquor, one without any additional sulphate, the other with such an addition of sulphate that the sulphate content of the liquor increased three times, from 1 to 3%, calculated as $SO_4$ upon the content of solids in the liquor. The gasification process was carried out at a gas mixture temperature of 665° C. The original liquor resulted in a sulphate content of 2.8% in the ashes, calculated upon the carbonate content, while the liquor containing additional sodium sulphate resulted in a sulphate content in the ashes of 2.9%, calculated upon the carbonate content.

*Example 9*

This experiment was made in order to illustrate the importance of the particle size and the atomizing method. A liquor of the composition described in the preceding examples was atomized, in a first case by steam to form particles having an average size of 50 microns, in a second case by a pressure-atomizing method to form particles having an average size of 750 microns. In both cases the liquor was sprayed into a hot gas to give a gas mixture temperature of 760° C. The ashes produced had in the first case a carbon content of 49% and a carbonate content of 43%, and had in the second case a carbon content of 62% and a carbonate content of 29%, while the contents of sulphate and iodine-consuming substances were approximately as low as in the experiments disclosed above, for instance a sulphate content of 6.4% and 6.3%, respectively, calculated upon the carbonate content of the ashes.

*Example 10*

As a comparison an experiment was made with a different spent liquor from a so-called semi-chemical cellulose manufacture, having the composition $$C_{10}H_{13.9}O_{10.1}S_{0.67}Na_{2.14}$$

The solids content of the liquor was 42%. The hot gas was produced by the combustion of fuel oil at a rate of 13 kg./h. with a stoichiometric amount of air. The liquor was supplied at a rate of 1.46 lit./min., resulting in a gas mixture temperature of 635° C. The particle size was about 50 microns, and the reaction time was about 5 seconds. The solid residue contained 31% carbon and 55% carbonate, and 2.2% iodine-consuming substances and 5.9% sodium sulphate, calculated upon the carbonate content.

What is claimed is:

1. A method of treating alkali-containing spent sulfite liquor for the recovery of the alkali metal content thereof mainly as alkali metal carbonate containing not more than 3% of iodine consuming substances and suitable for use for the preparation of fresh sulfite cooking liquor which comprises introducing a stream of hot combustion gas containing a limited amount of free oxygen into one end of a reaction chamber, introducing spent cellulose liquor in a finely divided state into said stream of hot combustion gas in the same end of said reaction chamber, passing the resulting mixture through the reaction chamber and separating the resulting suspended solids from the gas phase of said mixture, the residence time of said particles in said chamber being less than 30 seconds, and regulating the ratio of hot combustion gas to liquor, the temperature of the hot combustion gas, the concentration of the liquor and the particle size of said finely divided state of the liquor so that the equalized temperature in the reaction chamber is at least 500° C.

2. A method as claimed in claim 1 in which the quantities of hot combustion gas and spent liquor are regulated so as to give a residence time of the liquor particles in the reaction chamber of not more than 10 seconds.

3. A method as claimed in claim 1 in which the hot combustion gas is produced by the combustion of the gas formed during the reaction.

4. A method as claimed in claim 1 in which the hot combustion gas contains free oxygen and is produced by combustion of fuel with an air quantity which is at least stoichiometric with the fuel quantity and which is at most added in an excess of 1.2 m.³ at normal pressure and temperature for each kilogram of liquor solids.

5. A method as claimed in claim 1 in which the reaction of the liquor particles in the hot gas is only carried on to an incomplete gasification of the carbon and the solid particles after having been separated from the gas are burned separately.

6. A method as claimed in claim 5 in which the gas produced by burning said solid particles is utilized as the hot gas.

7. A method as claimed in claim 1 in which the gas produced in the reaction is utilized for the production of hot gas and the excess of gas produced in the reaction is utilized for other combustion purposes, the sulphur content of the flue gases produced in said other combustion purposes being recovered.

References Cited in the file of this patent

UNITED STATES PATENTS 2,261,995     Greenawalt _____ Nov. 11, 1941
2,535,730     Gadret _____ Dec. 26, 1950

OTHER REFERENCES

Bauer, "Canadian Journal of Technology," vol. 32, No. 3, May 1954, pages 95–101.